(12) United States Patent
Inoue et al.

(10) Patent No.: US 7,724,182 B2
(45) Date of Patent: May 25, 2010

(54) RADAR SYSTEM

(75) Inventors: Kenichi Inoue, Osaka (JP); Daisuke Ueda, Osaka (JP); Noboru Negoro, Osaka (JP); Hiroyuki Sakai, Kyoto (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 12/099,905

(22) Filed: Apr. 9, 2008

(65) Prior Publication Data

US 2008/0252513 A1    Oct. 16, 2008

(30) Foreign Application Priority Data

Apr. 16, 2007    (JP)    ............................. 2007-107640

(51) Int. Cl.
    *G01S 7/40*    (2006.01)
(52) U.S. Cl. ........................ 342/172; 342/165
(58) Field of Classification Search ................. 342/172
    See application file for complete search history.

(56) References Cited

U.S. PATENT DOCUMENTS

| | | | | |
|---|---|---|---|---|
| 3,167,767 | A * | 1/1965 | Capelli | 342/122 |
| 3,588,899 | A * | 6/1971 | Strauch | 342/87 |
| 3,774,206 | A * | 11/1973 | Rauch | 342/89 |
| 4,107,681 | A * | 8/1978 | Robertson et al. | 342/122 |
| 4,121,213 | A * | 10/1978 | Bush et al. | 342/172 |
| 4,683,473 | A * | 7/1987 | Haugland | 342/172 |
| 4,958,161 | A * | 9/1990 | Allezard | 342/122 |
| 5,223,840 | A * | 6/1993 | Cronyn | 342/170 |
| 5,300,934 | A * | 4/1994 | Asbell et al. | 342/172 |
| 5,431,568 | A * | 7/1995 | Fey et al. | 434/2 |
| 5,442,360 | A * | 8/1995 | Maignan et al. | 342/120 |
| 5,518,400 | A * | 5/1996 | Otoide et al. | 434/4 |
| 6,529,156 | B2 * | 3/2003 | Morchel et al. | 342/172 |
| 6,803,877 | B2 * | 10/2004 | Ludewig et al. | 342/169 |

(Continued)

FOREIGN PATENT DOCUMENTS

JP    5-341032    12/1993

(Continued)

OTHER PUBLICATIONS

English language Abstract of JP 2001-116828.

(Continued)

*Primary Examiner*—Thomas H Tarcza
*Assistant Examiner*—Matthew M Barker
(74) *Attorney, Agent, or Firm*—Greenblum & Bernstein, P.L.C

(57) ABSTRACT

The radar system includes: a transmission circuit transmitting the radar waves via a transmission antenna; a receiving circuit receiving the reflected waves via a receiving antenna; a delay line having an end connected to aid transmission circuit and the other end connected to said receiving circuit, which delays the radar waves by a predetermined delay amount; a correlation circuit/coherent detection circuit which detects a waveform having a strength equal to or higher than a predetermined strength, from a signal provided from said receiving circuit which obtains the signal from the reflected waves or the delayed radar waves; and a level decision circuit which judges, during self-diagnosis, whether or not the detected waveform is a waveform of the delayed radar wave according to the predetermined delay amount, and if the waveform is not the waveform of the delayed radar wave, determines that abnormality occurs in said radar system.

8 Claims, 12 Drawing Sheets

U.S. PATENT DOCUMENTS

| 7,548,188 | B2* | 6/2009 | Thomas et al. ............... 342/172 |
| 2007/0109175 | A1 | 5/2007 | Fukuda |
| 2007/0285307 | A1 | 12/2007 | Nishijima et al. |

FOREIGN PATENT DOCUMENTS

| JP | 2001-116828 | 4/2001 |
| JP | 2003-207561 | 7/2003 |

OTHER PUBLICATIONS

English language Abstract of JP 2003-207561.
English language Abstract of JP 5-341032.

* cited by examiner

PRIOR ART

FIG. 9
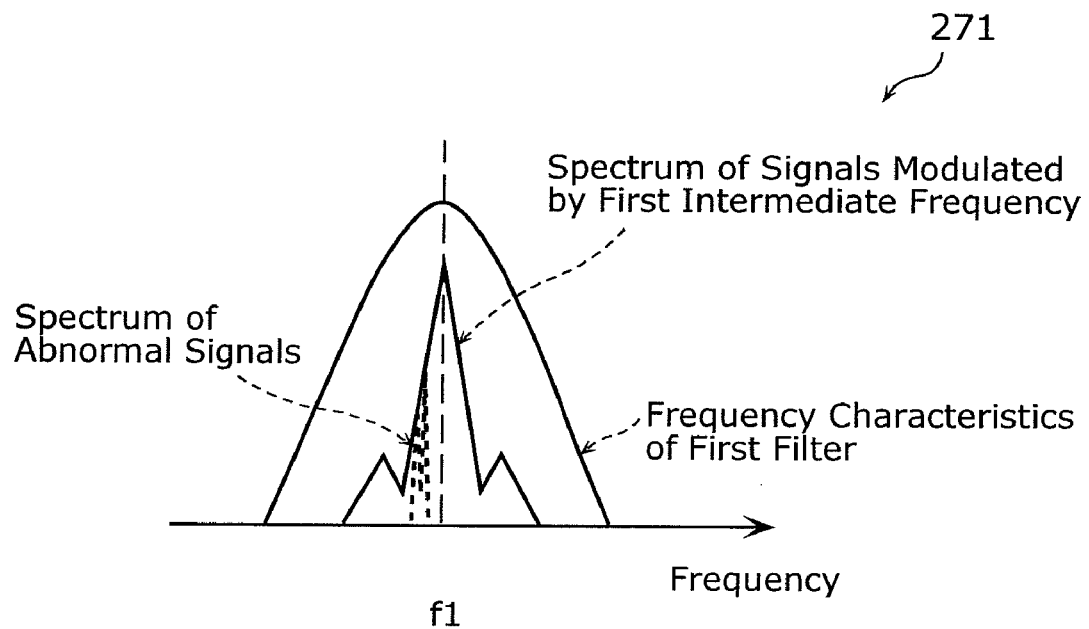
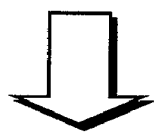
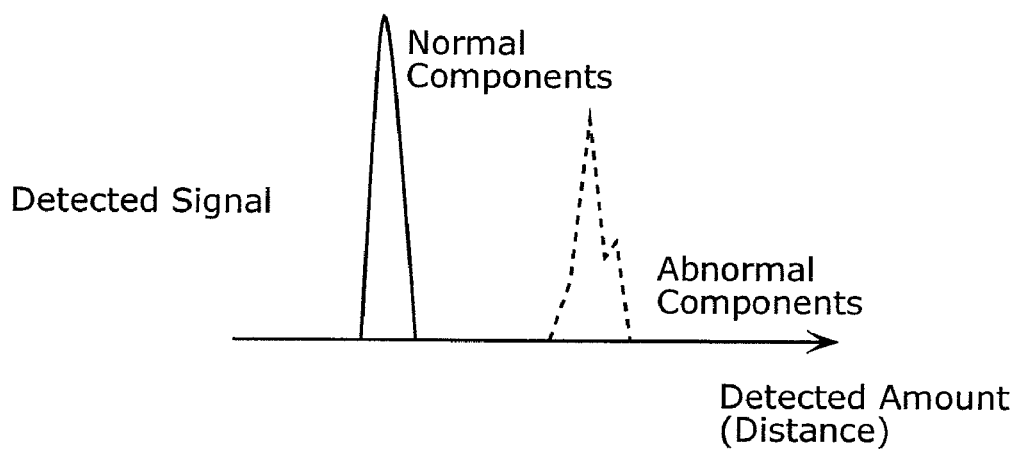

RADAR SYSTEM

BACKGROUND OF THE INVENTION (1) Field of the Invention

The present invention relates to a radar system with a self-diagnosis function.

(2) Description of the Related Art

In recent years, various technologies regarding radar systems equipped in vehicles (hereinafter, referred to as "in-vehicle radar systems") have been developed. The in-vehicle radar systems, which play roles in security, should be checked at starting or during operation to diagnose that the systems operate normally without any errors. Such diagnosis can be realized for the following three-type radar systems.

The radar system of the first type is shown in FIG. 1. This radar system 10 performs self-diagnosis on a receiving unit 21 and a transmission unit 22, using leakage signals between a transmission antenna 16 and a receiving antenna 11. In the radar system 10, a displacement oscillation circuit 14 emits signals having frequency for self-diagnosis, and the transmission antenna 16 outputs the signals. During self-diagnosis the receiving antenna 11 is also activated, and an analysis processing circuit 13 analyzes dimension (frequency, for example) of the signals received by the receiving antenna 11. Here, a collation circuit 23 collates transmitted frequency and received frequency, and abnormality of the system is determined based on the result of the collation (refer to Japanese Unexamined Patent Application Publication No. 2001-116828, for example).

The radar system of the second type determines abnormality of the system in the following manner. In the radar system, a part of radio waves which the radar system transmits is received by a detection antenna, and then provided to a delay transmission line. Then, beat signals generated in the delay transmission line are filtered by a band-pass filter and eventually analyzed to determine the abnormality. In this radar system, a delay amount (length) of the delay transmission line is set to be equivalent to the distance out of a range of detection (refer to Japanese Unexamined Patent Application Publication No. 2003-207561, for example).

The radar system of the third type detects a failure of the system, by determining abnormality of a multiplexer which multiplexes outputs of an oscillator. This radar system is equipped with a function of monitoring drain voltage generated in the multiplexer, and uses outputs of the function to determine abnormality (refers to Japanese Unexamined Patent Application Publication No. H05-341032, for example).

However, each of these radar systems of the prior arts needs the displacement oscillation circuit which emits signal patterns for the diagnosis and the analysis processing circuit in order to diagnose abnormality of the radar system, so that the radar system would be expensive and complicated.

In order to address the above problem, an object of the present invention is to provide a radar system which can easily diagnose abnormality of the system, using a simple and inexpensive structure.

SUMMARY OF THE INVENTION

In accordance with a first aspect of the present invention for achieving the object, there is provided (a) a radar system which transmits a radar wave, receives a reflected wave that is the radar wave which has been reflected or scattered at an object, and detects the object by the reflected wave, the radar system including: (a1) a transmission circuit which transmits the radar wave via a transmission antenna; (a2) a receiving circuit which receives the reflected wave via a receiving antenna; (a3) a delay line which has an end connected to an output port of the transmission circuit and an other end connected to an input port of the receiving circuit, and which delays the radar wave by a predetermined delay amount; (a4) a detection circuit which detects a waveform having a strength equal to or higher than a predetermined strength, from a signal provided from the receiving circuit which obtains the signal from one of the reflected wave and the radar wave delayed by the delay line; and (a5) a judgment circuit which judges, when self-diagnosis is performed, whether or not the waveform detected by the detection circuit is a waveform of the radar wave delayed by the delay line according to the predetermined delay amount, and if the waveform is not the waveform of the radar wave delayed by the delay line, determines that abnormality occurs in the radar system.

With the above structure, the radar system according to the present invention can easily detect abnormality occurred in the radar system itself, using a simple and inexpensive structure such as the delay line. This abnormality detection using a simple and inexpensive structure can be achieved, because the abnormality detection can be easily determined by detecting a waveform which occurs due to other aspects except a delay amount of the delay line although only delayed waveforms which are generated according to the delay amount should be detected. In other words, the radar system according to the present invention can achieve the abnormality detection using a simple and inexpensive structure such as the delay line, by distinguishing abnormal waveforms which occur due to other aspects except a delay amount of the delay line, from normal waveforms which are generated according to the delay amount.

(b) The radar system according may further includes: (b1) a first frequency generator which generates a signal having a first frequency; (b2) a first filter which passes a signal component of the first frequency, from the signal provided from the receiving circuit and (b3) a second filter which passes a signal component of a second frequency that is different from the first frequency, from the signal provided from the receiving circuit, (b4) wherein the receiving circuit outputs a signal into the first filter and the second filter, the signal being obtained by modulating one of the reflected wave and the radar wave delayed by the delay line, and the modulating being performed using the signal generated by the first frequency generator, (b5) the detection circuit detects a waveform having a strength equal to or higher than the predetermined strength, individually from (i) the signal component of the first frequency which is outputted from the receiving circuit via the first filter and (ii) the signal component of the second frequency which is outputted from the receiving circuit via the second filter, and (b6) the judgment circuit determines that abnormality occurs in the radar system, if there is the waveform having the strength equal to or higher than the predetermined strength from among the waveform detected from the signal component of the second frequency by the detection circuit.

With the above structure, when self-diagnosis is performed, the radar system according to the present invention can easily detect abnormality occurred in the radar system itself, using a simple and inexpensive structure such as the intermediate frequency generator and the plurality of filters. Furthermore, the radar system according to the present invention can detect the abnormal waveforms which have erroneously occurred in the radar system due to various aspects, thereby reducing a possibility of outputting the abnormal waveforms. Still further, the intermediate frequency generator and the plurality of filters are used even when the radar system performs a normal operation, so that the radar system according to the present invention can easily detect abnormality occurred in the radar system itself while all elements which are used during the normal operation are activated.

(c) The radar system may further include: (c1) a first frequency generator which generates a signal having a first frequency; (c2) a second frequency generator which generates a signal having a second frequency that is different from the first frequency; (c3) a frequency switch which selects one of the signal generated by the first frequency generator and the signal generated by the second frequency generator; and (c4) a first filter which passes a signal component of the first frequency, from the signal provided from the receiving circuit, (c5) wherein the receiving circuit outputs a signal into the first filter, the signal being obtained by modulating one of the reflected wave and the radar wave delayed by the delay line, and the modulating being performed using the signal selected by the frequency switch, (c6) the detection circuit detects a waveform having a strength equal to or higher than the predetermined strength, individually from the signal component of the first frequency which is outputted from the receiving circuit via the first filter, and (c7) the judgment circuit determines that abnormality occurs in the radar system, if there is the waveform having the strength equal to or higher than the predetermined strength from among the waveform detected from the signal component of the first frequency by the detection circuit, when the frequency switch selects the signal generated by the second frequency generator.

With the above structure, when self-diagnosis is performed, the radar system according to the present invention can easily detect abnormality occurred in the radar system itself, using a simple and inexpensive structure such as the plurality of intermediate frequency generators and the filter. Furthermore, the radar system according to the present invention can detect the abnormal waveforms which have erroneously occurred in the radar system due to various aspects, thereby reducing a possibility of outputting the abnormal waveforms. Still further, the plurality of intermediate frequency generators and the filter are used even when the radar system performs a normal operation, so that the radar system according to the present invention can easily detect abnormality occurred in the radar system itself while all elements which are used during the normal operation are activated.

Accordingly, the radar system according to the present invention can detect the abnormal waveforms occurred in the radar system itself, using only the same auxiliary circuits as the circuits required in the radar systems without the self-diagnosis function. Thereby, the radar system according to the present invention can prevent size and cost increase.

Thus, the radar system according to the present invention can easily detect abnormality occurred in the radar system itself, using a simple and inexpensive structure such as the delay line. This abnormality detection using a simple and inexpensive structure can be achieved, because the abnormality detection can be easily determined by detecting a waveform which occurs due to other aspects except a delay amount of the delay line although only delayed waveforms which are generated according to the delay amount should be detected. In other words, the radar system according to the present invention can detect abnormality occurred in the radar system itself, by distinguishing abnormal waveforms which occur due to other aspects except a delay amount of the delay line, from normal waveforms which are generated according to the delay amount.

Furthermore, when self-diagnosis is performed, the radar system according to the present invention can easily detect abnormality occurred in the radar system itself, using a simple and inexpensive structure such as the plurality of intermediate frequency generators and the filter. Still further, the radar system according to the present invention can detect the abnormal waveforms which have erroneously occurred in the radar system due to various aspects, thereby reducing a possibility of outputting the abnormal waveforms. Still further, the intermediate frequency generator and the plurality of the filters are used even when the radar system performs a normal operation, so that the radar system according to the present invention can easily detect abnormality occurred in the radar system itself while all elements which are used during the normal operation are activated.

It should be noted that the present invention can be realized not only as the above radar system, but also as a radar device including the elements in the radar system, for example.

Further Information about Technical Background to this Application

The disclosure of Japanese Patent Application No. 2007-107640 filed on Apr. 16, 2007 including specification, drawings and claims is incorporated herein by reference in its entirety.

BRIEF DESCRIPTION OF THE DRAWINGS

These and other objects, advantages and features of the present invention will become apparent from the following description thereof taken in conjunction with the accompanying drawings that illustrate specific embodiments of the present invention. In the Drawings:

FIG. 9 shows graphs for explaining an outline of the first diagnosis method performed by the radar system according to the second embodiment of the present invention;

DESCRIPTION OF THE PREFERRED EMBODIMENT(S)

Figure 1:
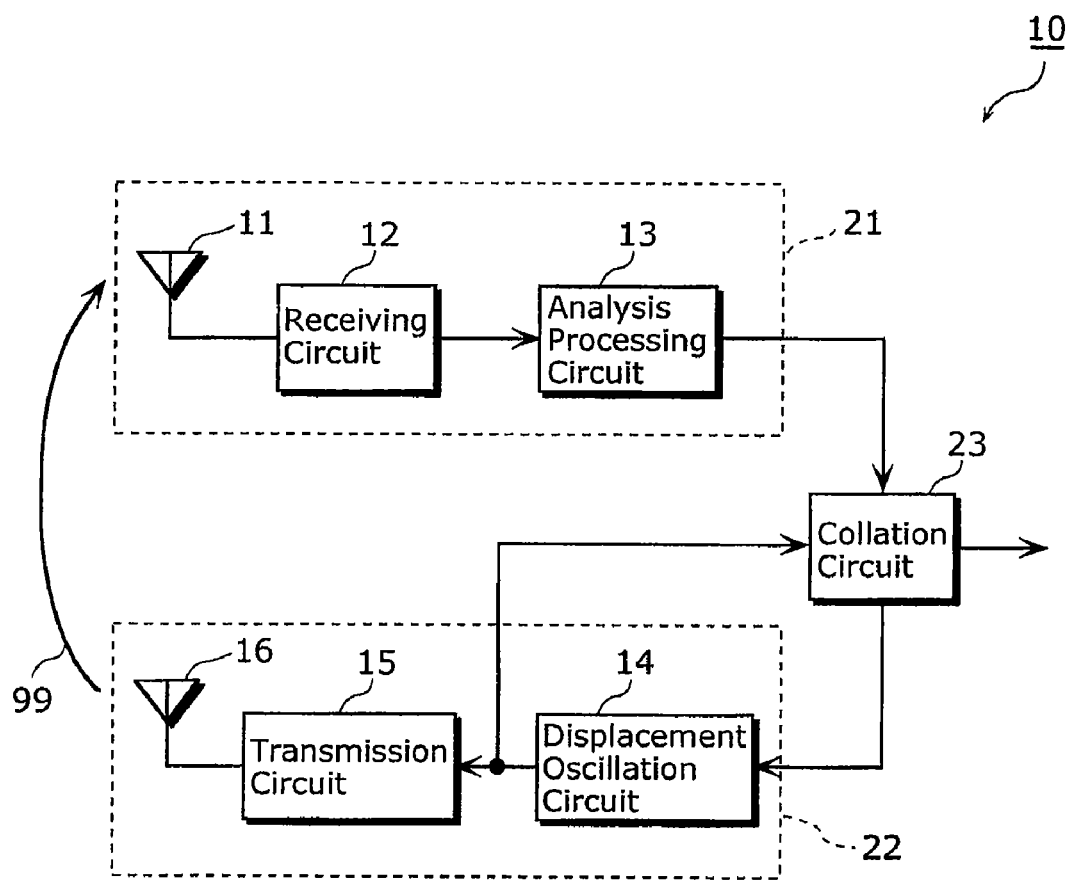
FIG. 1 is a block diagram showing a structure of a radar system with a self-diagnosis function, according to the prior art.

The following describes the embodiments of the present invention with reference to the drawings.

First Embodiment

The following describes the first embodiment of the present invention with reference to the drawings.

The radar system according to the first embodiment includes the following features (a) and (b). (a) The radar system which transmits a radar wave, receives a reflected wave that is the radar wave which has been reflected or scattered at an object, and detects the object by the reflected wave, the radar system including: (a1) a transmission circuit which transmits the radar wave via a transmission antenna; (a2) a receiving circuit which receives the reflected wave via a receiving antenna; (a3) a delay line which has an end connected to an output port of the transmission circuit and an other end connected to an input port of the receiving circuit, and which delays the radar wave by a predetermined delay amount; (a4) a detection circuit which detects a waveform having a strength equal to or higher than a predetermined strength, from a signal provided from the receiving circuit which obtains the signal from one of the reflected wave and the radar wave delayed by the delay line; and (a5) a judgment circuit which judges, when self-diagnosis is performed, whether or not the waveform detected by the detection circuit is a waveform of the radar wave delayed by the delay line according to the predetermined delay amount, and if the waveform is not the waveform of the radar wave delayed by the delay line, determines that abnormality occurs in the radar system.

(b) The delay line is connected to the output port of the transmission circuit or the input port of the receiving circuit via a switch.

The radar system according to the first embodiment may include the following features (c) to (f).

(c) The radar system further includes: a plurality of delay lines including the delay line; and a plurality of switches including the switch are included in each of the plurality of delay lines, and a delay line by which the radar wave is to be delayed is selected from among the plurality of delay lines, depending On or OFF of each of the plurality of the switches.

(d) The radar system employs a spread spectrum scheme using a pseudo noise code, and a line length of the delay line is shorter than a line length of a maximum delay line by which the radar wave is delayed by a delay amount equivalent to one cycle of a code length of the pseudo noise code.

(e) In the radar system, the end of the delay line is connected to the transmission circuit via the transmission antenna.

(f) The radar system further includes: (f1) a storage circuit in which the predetermined delay amount is stored; and (f2) a correction circuit which calibrates the radar system according to a delay amount of the waveform detected by the detection circuit and the predetermined delay amount stored in the storage circuit.

Based on the above, the radar system according to the first embodiment is described herein.

When a normal operation is performed, the radar system according to the first embodiment detects an object, by transmitting radar waves, then receiving reflected waves that are the radar waves which have been reflected or scattered at an object, and eventually checking the received reflected waves to detect the object. On the other hand, when self-diagnosis is performed, the radar system according to the first embodiment detects abnormality occurred in the radar system itself, by passing radar waves through a delay line to delay the radar waves by a predetermined delay amount, and then checking the delayed radar waves to determine whether or not any abnormal waves occur.

Figure 2:
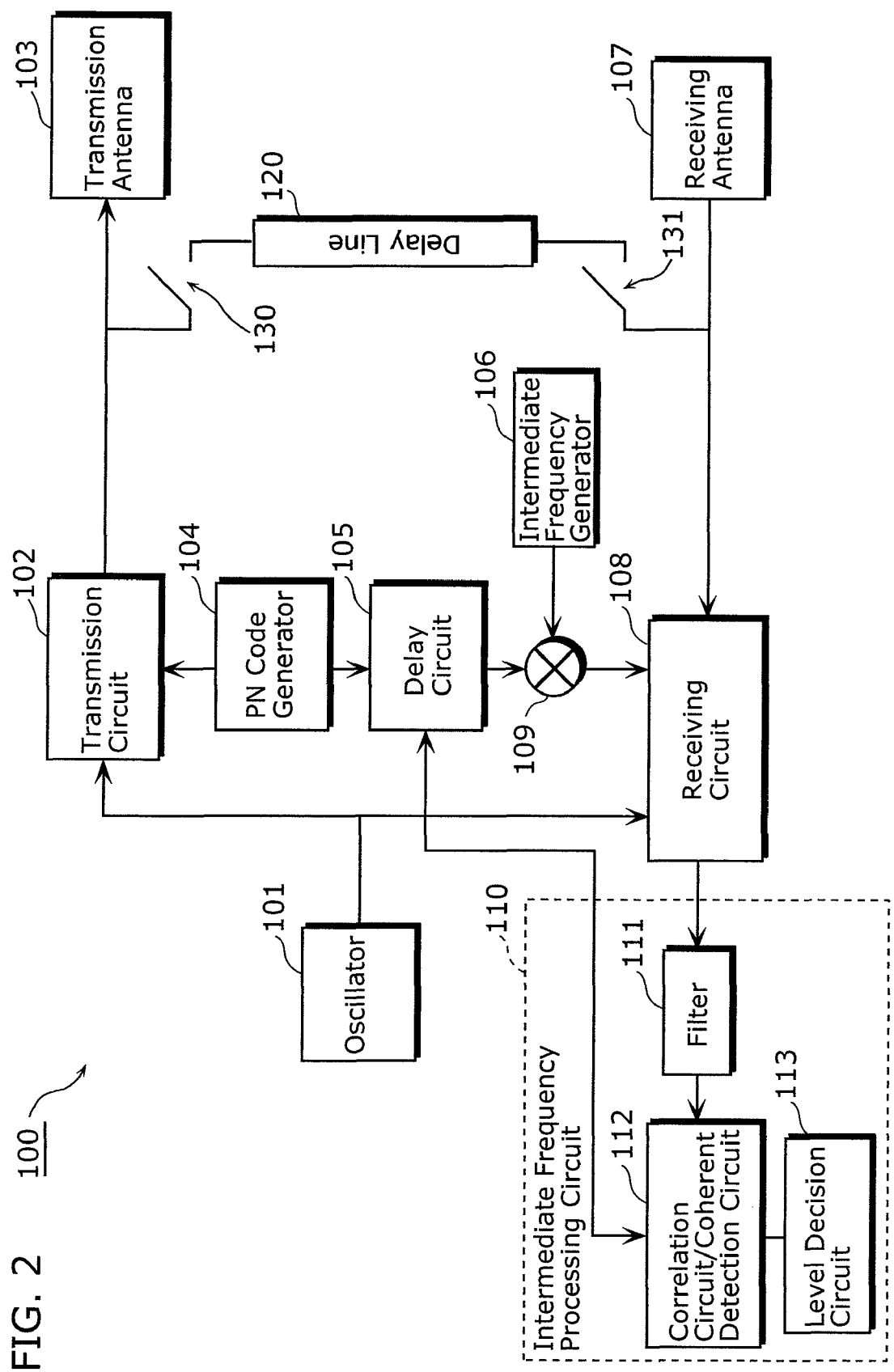
FIG. 2 is a block diagram showing a structure of a radar system according to the first embodiment of the present invention.

FIG. 2 is a block diagram showing a structure of the radar system according to the first embodiment of the present invention. As shown in FIG. 2, the radar system 100 according to the first embodiment is a radar system employing a spread spectrum scheme using pseudo noise codes (hereinafter, referred to as "PN codes").

In this example of FIG. 2, the radar system 100 includes an oscillator 101, a transmission circuit 102, a transmission antenna 103, a PN code generator 104, a delay circuit 105, an intermediate frequency generator 106, a receiving antenna 107, a receiving circuit 108, a mixer 109, an intermediate frequency processing circuit 110, and a delay line 120.

The oscillator 101 generates carrier waves and provides the generated carrier waves to the transmission circuit 102 and the receiving circuit 108. Here, as the carrier waves the oscillator 101 generates, high frequency signals whose frequency ranges from several GHz to several dozen GHz, such as microwave band or millimeter waveband, for example, are used.

The transmission circuit 102 spreads (modulates; binary phase shiftkeying, for example) the carrier waves obtained from the oscillator 101, using the PN code obtained from the PN code generator 104. Then, when a normal operation is performed, the transmission circuit 102 provides the resulting carrier waves (hereinafter, referred to as "transmission signals") to the transmission antenna 103.

During the normal operation, the transmission antenna 103 transmits the transmission signals obtained from the transmission circuit 102, as radar waves, to the outside (free space).

The PN code generator 104 generates a PN code and provides the generated PN code to the transmission circuit 102 and the delay circuit 105. Here, as the PN code the PN code generator 104 generates a M-sequence code, a Gold-sequence code, or the like, for example.

The delay circuit 105 delays the PN code obtained from the PN code generator 104, and provides the delayed PN code to the mixer 109.

The intermediate frequency generator 106 generates an intermediate frequency signal whose intermediate frequency is lower than the frequency of the carrier waves generated by the oscillator 101, and provides the generated intermediate frequency signal to the mixer 109. Here, as the intermediate frequency signal, the intermediate frequency generator 106 generates a signal whose frequency ranges from several kHz to several hundreds of kHz, for example.

During the normal operation, the receiving antenna 107 receives, as a received signal, reflected waves which have been transmitted by the transmission antenna 103 and then reflected or scattered at an object (obstacle).

The mixer 109 mixes the intermediate frequency signal provided from the intermediate frequency generator 106 and the PN code provided from the delay circuit 105, and then provides the receiving circuit 108 with the resulting code in which the intermediate frequency is superimposed on the PN code.

The receiving circuit 108 performs despreading on the received signal received by the receiving antenna 107, using the PN code obtained from the mixer 109, then performs quadrature detection (demodulation) on the despread signal using the carrier waves obtained from the oscillator 101, and eventually provides the quadrature-detected signal to the intermediate frequency processing circuit 110.

Here, it is should be noted that the demodulated signal which is generated by the despreading and the quadrature detection in the receiving circuit 108 is downconverted into an intermediate frequency. It should also be noted that, when the received signal includes reflected waves and there is an auto-correlation between a PN code used to spread the reflected waves and the PN code obtained from the mixer 109, the modulated signal includes a peak waveform due to the autocorrelation of the PN code. On the other hand, when the received signal does not include any reflected waves, the modulated signal does not include such a peak waveform since there is no auto-correlation between the received signal and a PN code obtained from the mixer 109. It should also be noted that the signal generated by the quadrature detection is separated into in-phase (I) components and quadrature (Q) components.

The intermediate frequency processing circuit 110 performs signal processing on the signals provided from the receiving circuit 108. It should be noted that the intermediate frequency processing circuit 110 performs the completely same processing on both of the in-phase (I) components and the quadrature (Q) components. For the sake of conciseness of the description, hereinafter it is assumed that the intermediate frequency processing circuit 110 has a structure for only one component.

Here, the intermediate frequency processing circuit 110 includes a filter 111, a correlation circuit/coherent detection circuit 112, and a level decision circuit 113, for example.

The filter 111 passes signal components having a predetermined frequency, from the signal provided from the receiving circuit 108. For example, the filter 111 is assumed to pass signal components whose frequency ranges from several kHz to several hundreds of kHz.

Regarding the reflected waves, the correlation circuit/coherent detection circuit 112 detects, from the signals provided from the filter 111, a waveform having a strength equal to or higher than a predetermined strength, and thereby detects a peak waveform of the signal due to autocorrelation of the PN code. Then, the correlation circuit/coherent detection circuit 112 demodulates intermediate frequency signals and determines a delay amount of the detected waveform, using a time period by which the PN code is delayed by the delay circuit 105.

When the normal operation is performed, the level decision circuit 113 checks existence of any objects from the waveform detected by the correlation circuit/coherent detection circuit 112. On the other hand, when self-diagnosis is performed, the level decision circuit 113 checks whether or not the waveform detected by the correlation circuit/coherent detection circuit 112 is the waveform (hereinafter, referred to also as a "delayed waveform") which is generated according to the delay amount of the delay line 120. If the detected waveform is different from the delayed waveform but erroneously occurs due to other aspects except the delay amount, the level decision circuit 113 determines that the system has abnormality.

Each end of the delay line 120 is connected to a switch which can block the high frequency signals so that high frequency signals cannot be passed through the delay line 120 when the normal operation is performed, but the high frequency signals can be passed through the delay line 120 when the radar system 100 performs self-diagnosis. Furthermore, when the high frequency signal is passed, the delay line 120 delays the high frequency signals by a delay amount of the delay line 120, to be outputted. Here, the high frequency signals are, for example, carrier waves outputted from the transmission circuit 102. The carrier waves which have passed through the delay line 120 during the self-diagnosis are then inputted as received signals to the receiving circuit 108. Then, the receiving circuit 108 and the intermediate frequency processing circuit 110 process the propagation signals in the same manner as the received signals provided from the receiving antenna 107 during the normal operation is performed on the propagation signals.

In more detail, the delay line 120 is a co-axial cable. One end of the delay line 120 is connected to the transmission circuit 102 and the transmission antenna 103 via a switch 130, and the other end of the delay line 120 is connected to the receiving antenna 107 and the receiving circuit 108 via a switch 131.

The switches 130 and 131 are single pole/double throw (SPDT) field effect transistor (FET) switches, each of which is terminated at 50 ohm when the switch is OFF so that reflection due to the switches can be prevented. During the normal operation, the switches are OFF so that the transmission signals (high frequency signals) cannot be passed through the delay line 120. On the other hand, during the self-diagnosis, the switches are ON so that the transmission signals (high frequency signals) are passed through the delay line 120.

Accordingly, during the self-diagnosis, the radar system according to the present invention passes signals through the delay line 120, thereby inputting the delayed signals to the intermediate frequency processing circuit 110 via the receiving circuit 108. As above, the radar system according to the present invention can distinguish the normal waveforms which are generated due to the delay amount of the delay line, from abnormal waveforms which occur due to other aspects except the delay amount. Thereby, during the self-diagnosis, by detecting a peak waveform which occurs due to other aspects except a delay amount of the delay line although only peak waveforms (delayed waveforms) which are generated according to the delay amount should be detected, it is possible to easily determine that the radar system is not in a normal condition. As above, the radar system according to the present invention can distinguish the normal waveforms which are generated according to the delay amount of a delay line, from abnormal waveforms which occur due to other aspects except the delay amount.

Thus, the radar system according to the present invention can easily detect abnormality occurred in the radar system itself, using a simple and inexpensive structure such as the delay line.

It should be noted that the delay line 120 is not limited to the co-axial cable, but may be a metal transmission line or a dielectric line, or the like. It should also be noted that, although FIG. 2 shows a shape of the delay line 120 as a rectangle, this shows only that the delay line 120 has short and long sides, and an area and lengths of the rectangle do not show an exact design or a proportion of the sides of the delay line 120. In addition, the shape of the delay line 120 is not limited to a rectangle.

It should also be noted that the switches 130 and 131 are not limited to the above-described transistors, but may be any mechanical switches.

It should also be noted that, as far as influence to the system is acceptable, the switches 130 and 131 may be always ON, or the transmission signals (high frequency signals) may be always passed through the delay line 120 without using the switches 130 and 131. For example, if a delay amount of the delay line 120 is set to be smaller than a delay amount corresponding to a minimum detected distance of radar and abnormality of the system is diagnosed within the minimum detected distance, the transmission signals (high frequency signals) may be always passed through the delay line 120, since the influence to the system is acceptable.

It should also be noted that it has been described that a unit of the delay amount is a time period, but the unit of the delay amount is not limited to a time period and may be any other unit.

First Modification of First Embodiment

Figure 3:
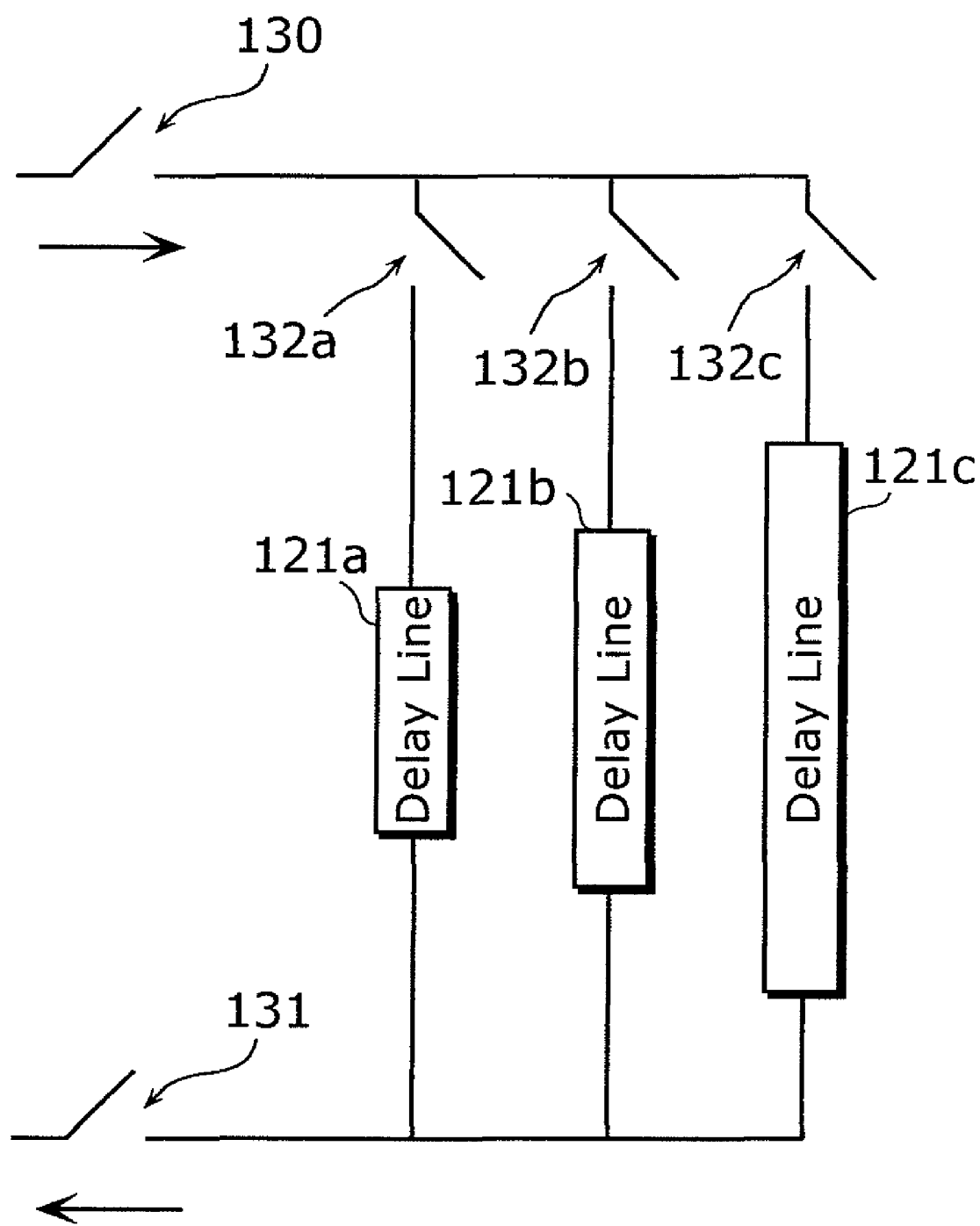
FIG. 3 is a diagram showing delay lines according to the first modification of the first embodiment of the present invention.

The following described the first modification of the first embodiment. For example, in the radar system according to the first modification of the first embodiment, the delay line 120 is replaced by the delay lines 121a, 121b, and 121c and the switches 132a, 132b, and 132c, as shown in FIG. 3.

Here, the switches 132a, 132b, and 132c are connected to the delay lines 121a, 121b, and 121c, respectively. Furthermore, the switches 130 and 131 and the switches 132a to 132c, which are arranged for the delay lines 121a to 121c, are separately controllable to be turned ON and OFF from the outside.

Figure 4:
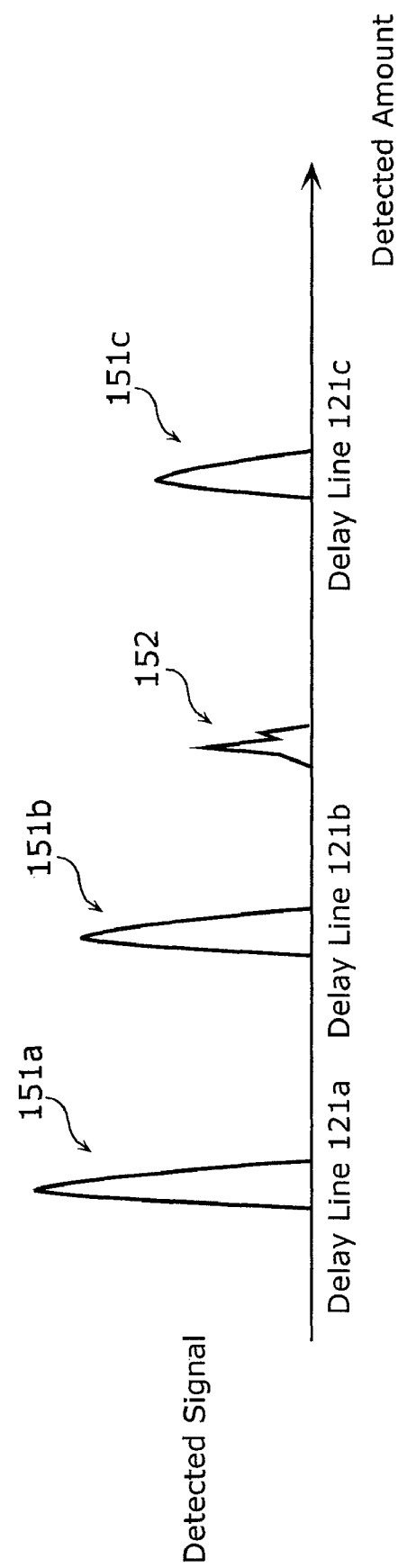
FIG. 4 is a graph showing detected signals according to the first modification of the first embodiment of the present invention.

Moreover, as shown in FIG. 4, it is assumed that the detected signals have delayed waveforms 151a, 151b, and 151c generated according to delay amounts of the delay lines 121a, 121b, and 121c, respectively.

Under the assumption, the level decision circuit 113 determines that abnormality occurs in the system when any waveform different from the delayed waveforms 151a, 151b, and 151c exists in the detected signals.

In addition, the level decision circuit 113 checks whether or not the detected signals has the delayed waveforms 151a, 151b, or 151c by turning the switch 132a, 132b, and 132c ON/OFF, respectively. Thereby, it is possible to distinguish delayed waveforms which are generated by the delay line, from abnormal waveforms which are overlapped on the delayed waveforms.

Moreover, regardless of the existence of the abnormal waveforms, it is possible to check whether or not the delay amount is associated with a position at which the waveform exists, only examining each relationship between (i) the turning ON/OFF of the switch 132a, 132b, or 132c and (ii) existence of the delayed waveform 151a, 151b, or 151c.

The above can be realized using a memory (storage device) having a quite small capacity for storing the delay amounts of the delay lines, in addition to the correlation circuit/coherent detection circuit 112 and the level decision circuit 113.

Figure 5:
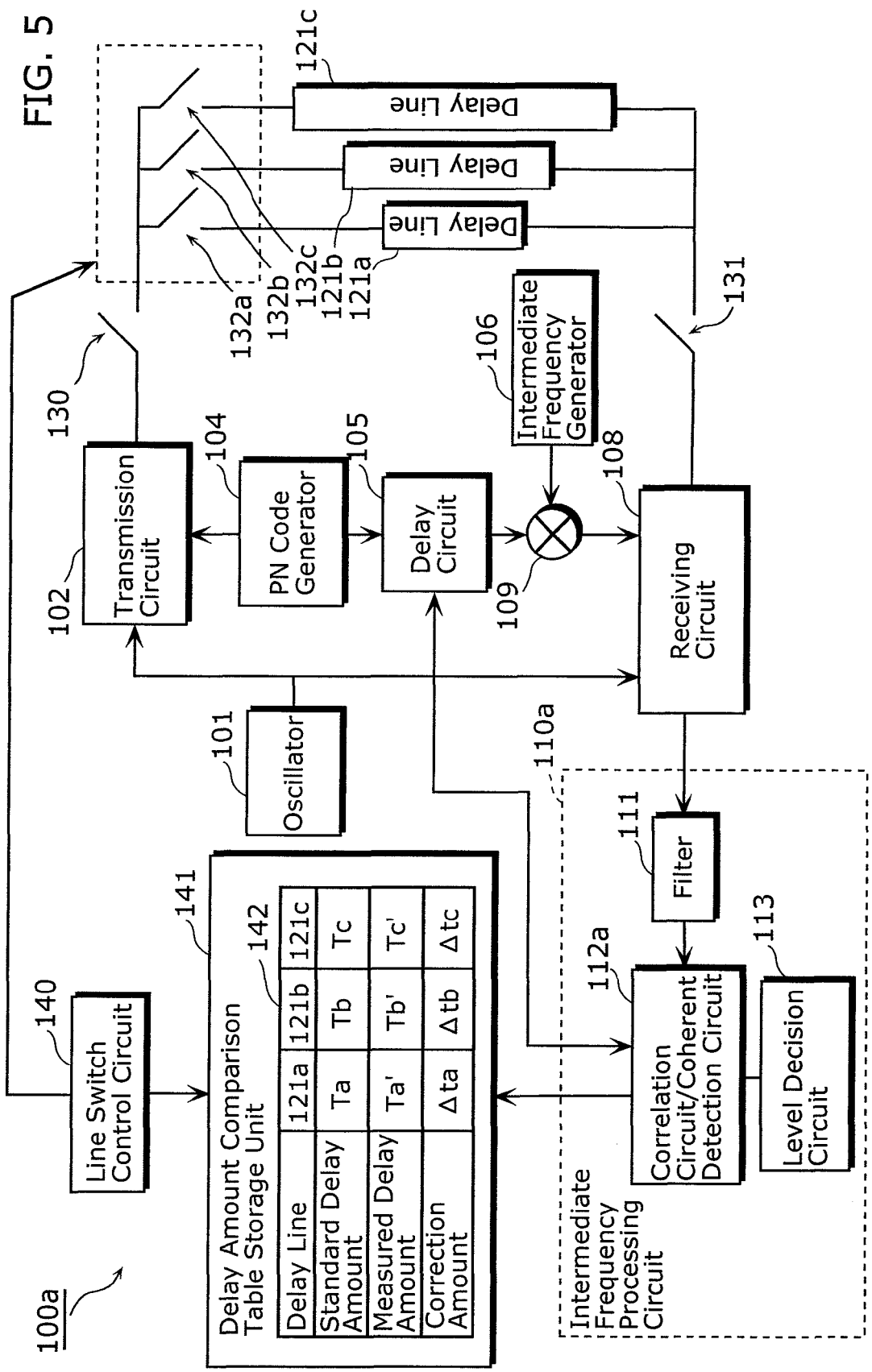
FIG. 5 is a block diagram showing a structure of a radar system according to the first modification of the first embodiment of the present invention.

Here, it is assumed that the frequency generated by the oscillator 101 is slightly changed due to environment temperature change or the like, thereby causing a difference between a delay amount which is predetermined for the delay line (hereinafter, referred to as a "standard delay amount") and a delay amount which actually occurs and is measured (hereinafter, referred to as a "measured delay amount"). Under the assumption, by utilizing the above-explained structure it is possible that the standard delay amount is previously stored, then when the measured delay amount is obtained the difference between the measured delay amount and the standard delay amount is calculated, and eventually the calculated difference is used to calibrate the system. FIG. 5 is a block diagram showing a structure of a radar system according to the first modification of the first embodiment of the present invention. As shown in FIG. 5, a structure of the radar system 100a of the first modification is basically the same as the structure of the radar system 100 of FIG. 2. However, the radar system 100a of FIG. 5 differs from the radar system 100 of FIG. 2 in that the delay line 120 is replaced by delay lines 121a, 121b, and 121c and switches 132a, 132b, and 132c, and the intermediate frequency processing circuit 110 is replaced by the intermediate frequency processing circuit 110, and that a line switch control circuit 140 and a delay amount comparison table storage unit 141 are added. For the sake of conciseness of the description, the following description is given for only the delay line 121a.

As shown in FIG. 5, the line switch control circuit 140 controls the switches 132a, 132b, and 132c to be turned ON/OFF. Here, it is assumed that the line switch control circuit 140 turns the switch 132 ON, thereby the transmission signals are propagated from the transmission circuit 102 to the receiving circuit 108 through the delay line 121a, and the correlation circuit/coherent detection circuit 112a detects a waveform which is generated by the delay line 121a according to a measured delay amount Ta'. It is also assumed that the delay amount comparison table storage unit 141 beforehand has a delay amount comparison table 142 in which a standard delay amount Ta in the case where transmission signals are passed through the delay line 121a is stored. The standard delay amount is a predetermined amount to be used for the delay line. The delay amount comparison table 142 also stores a measured delay amount which is an actual delay amount used in the delay line. Under the assumption, a difference (offset amount) between the measured delay amount and the standard delay amount, $\Delta ta = Ta' - Ta$, is calculated, and the calculated value is used as an amount of correction to calibrate the radar system 100a. If plural differences, $\Delta ta$, $\Delta tb$, and $\Delta tc$ for example, are calculated from plural delay lines, the arithmetical average of the differences $(\Delta ta + \Delta tb + \Delta tc)/3$ is used to an unique amount of correction. It is also possible to use an interpolation among the offset amounts $\Delta ta$, $\Delta tb$, and $\Delta tc$, for a measured value which is not contained in the comparison table 142.

Second Modification of First Embodiment

Figure 6:
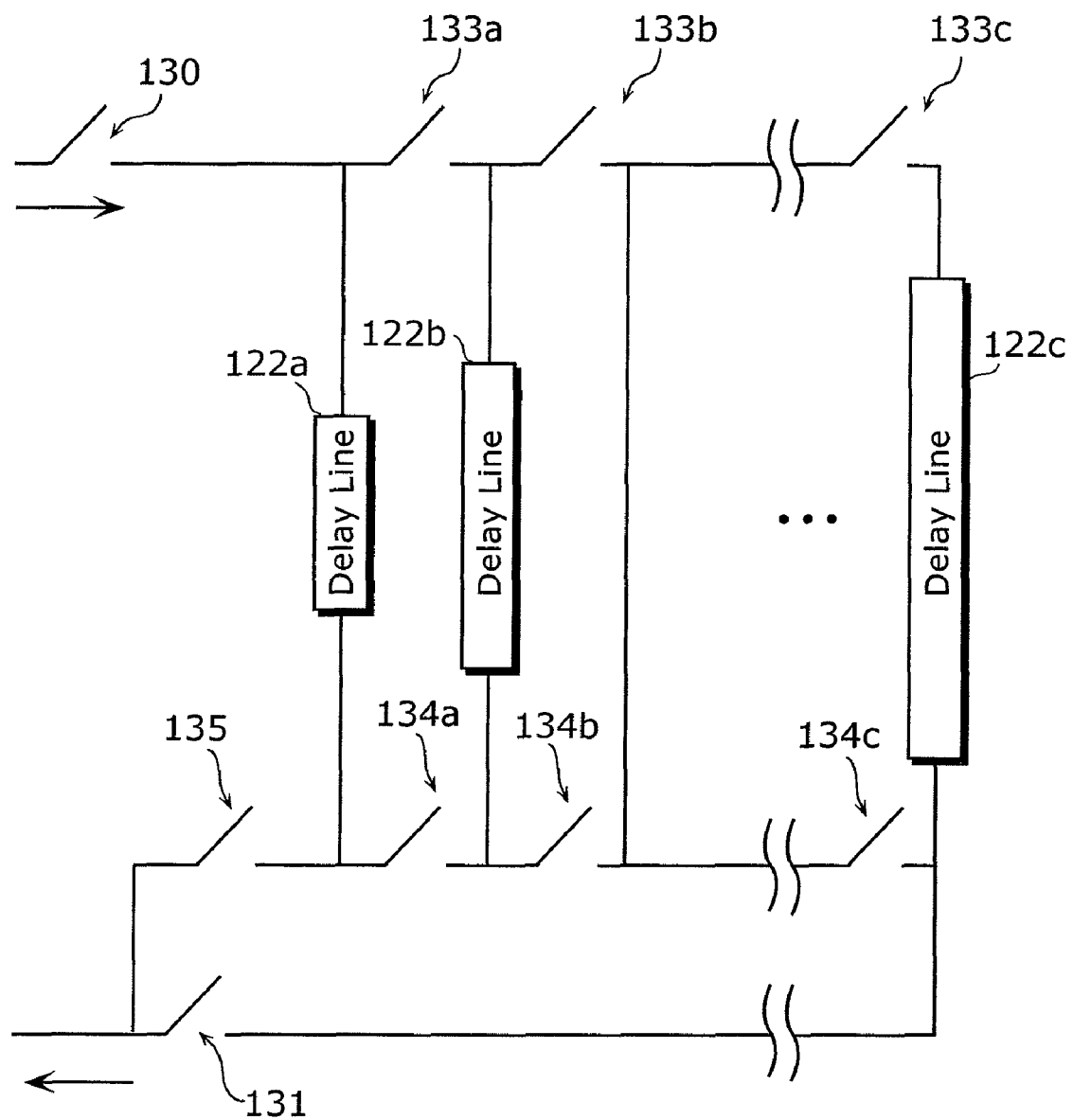
FIG. 6 is a diagram showing delay lines according to the second modification of the first embodiment of the present invention.

The following described the second modification of the first embodiment. For example, as shown in FIG. 6, in the radar system according to the second modification of the first embodiment, the delay line 120 is replaced by the delay lines 122a, 122b, and 122c and switches 133a, 133b, 133c, 134a, 134b, 134c, and 135.

Here, the switches 130, 131, 133a to 133c, 134a to 134c, and 135, which are arranged for the delay lines 122a to 122c, are separately controllable to be turned ON and OFF from the outside. Therefore, by combining the turning ON/OFF of these switches, it is possible to configure various delay paths. Furthermore, by preparing more delay lines, it is possible to generate more various patterns of delays. Then, the more the delay amount patterns, the more the operation of the radar system during the self-diagnosis becomes similar to a situation predicted during the normal operation, so that the detection can be performed exactly.

In addition, by using the switches arranged for the delay lines, a transmission signal is reciprocated between the switches, thereby increasing the delay amount. For example, firstly the switch 130 is turned ON and the switch 131 is turned OFF. Then, the switches 133*a* and 135 are turned OFF. In this case, after the transmission signal is passed through the switch 130, the switch 130 is turned OFF. As a result, the transmission signal is attenuated being repeatedly reflected inside the delay line 122*a*. Then, if the switch 135 is turned ON, a transmission signal having delay and attenuation corresponding to the amount of the reciprocating inside the delay line 122*a* is outputted to the receiving circuit 108. Here, it is desirable that a possible reflection mode and a strength attenuation amount are previously calculated, and thereby positions of respective delay lines and switches are exactly designed.

It is further desirable that a line length of each of the delay line is set so that the line length is equal to or shorter than a maximum line length corresponding to a length of reciprocating of the maximum detectable distance of radar, for example. Here, in the spread spectrum scheme, this length can be set up to a length equivalent to one cycle of a PN code at maximum. Thereby, it is possible to previously detect all abnormal waveforms occurred within a detection distance of radar, which is effective. Hereinafter, the delay line whose line length is the maximum line length is referred to as a maximum delay line.

Further, it is desirable that each delay line is a single (ceaseless) line so that carrier waves are not reflected inside the delay line. For example, each delay line may be a co-axial cable or a waveguide for preventing leakage between the lines.

Figure 7:
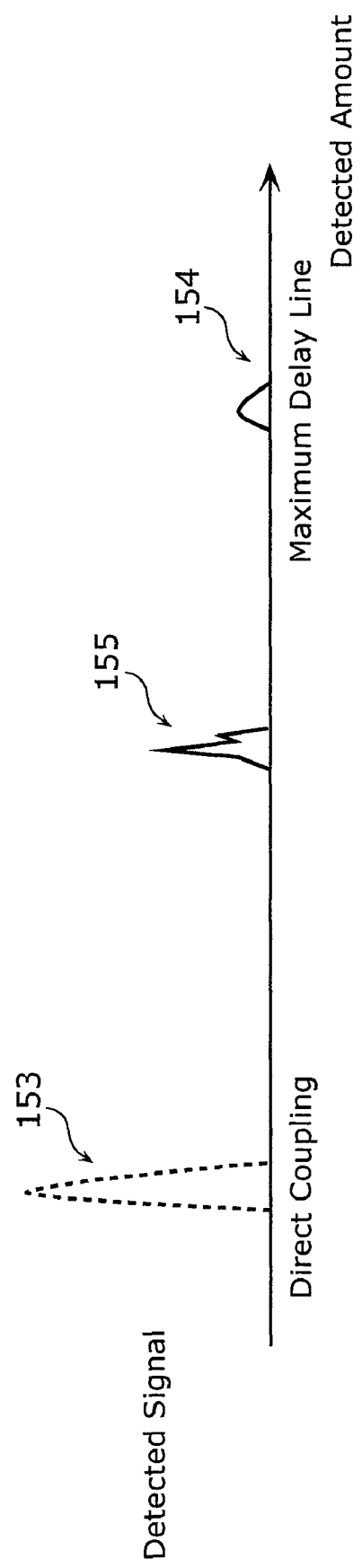
FIG. 7 is a graph showing detected signals according to the second modification of the first embodiment of the present invention.

Moreover, as shown in FIG. 7, it is assumed that the detected signal outputted from the correlation circuit/coherent detection circuit 112 has a waveform 155 between a waveform 153 and a waveform 154. Here, the waveform 153 is a waveform which is generated due to leakage (direct coupling) between the transmission antenna 103 and the receiving antenna 107. The waveform 154 is generated by being passed through a maximum delay line. Here, it is assumed that the delay line is a single co-axial cable. It is also assumed that it has been previously checked that the co-axial cable has no damage and reflection does not occur inside the co-axial cable.

In this case, if the detected signal has the waveform 155, there is a possibility that some sort of abnormality is detected, so that the level decision circuit 133 determines that abnormality occurs in the system. This is because, since such a co-axial cable is used, a waveform of reflected waves should not exist between the waveform 153 and the waveform 154, so that the waveform such as the waveform 155 is considered as a waveform which has occurred due to abnormal aspects except reflection.

It should be noted that the above-described structure is not limited to the radar system of the spread spectrum scheme, but may be used for other systems.

Second Embodiment

The following describes the second embodiment of the present invention with reference to the drawings.

The radar system according to the second embodiment may include the following features (g) to (i).

(g) The radar system further includes: (g1) a first frequency generator which generates a signal having a first frequency; (g2) a first filter which passes a signal component of the first frequency, from the signal provided from the receiving circuit; and (g3) a second filter which passes a signal component of a second frequency that is different from the first frequency, from the signal provided from the receiving circuit, (g4) wherein the receiving circuit outputs a signal into the first filter and the second filter, the signal being obtained by modulating one of the reflected wave and the radar wave delayed by the delay line, and the modulating being performed using the signal generated by the first frequency generator, (g5) the detection circuit detects a waveform having a strength equal to or higher than the predetermined strength, individually from (i) the signal component of the first frequency which is outputted from the receiving circuit via the first filter and (ii) the signal component of the second frequency which is outputted from the receiving circuit via the second filter, and (g6) the judgment circuit determines that abnormality occurs in the radar system, if there is the waveform having the strength equal to or higher than the predetermined strength from among the waveform detected from the signal component of the second frequency by the detection circuit.

(h) The radar system further includes: (h1) a first frequency generator which generates a signal having a first frequency; (h2) a second frequency generator which generates a signal having a second frequency that is different from the first frequency; (h3) a frequency switch which selects one of the signal generated by the first frequency generator and the signal generated by the second frequency generator; and (h4) a first filter which passes a signal component of the first frequency, from the signal provided from the receiving circuit, (h5) wherein the receiving circuit outputs a signal into the first filter, the signal being obtained by modulating one of the reflected wave and the radar wave delayed by the delay line, and the modulating being performed using the signal selected by the frequency switch, (h6) the detection circuit detects a waveform having a strength equal to or higher than the predetermined strength, individually from the signal component of the first frequency which is outputted from the receiving circuit via the first filter, and (h7) the judgment circuit determines that abnormality occurs in the radar system, if there is the waveform having the strength equal to or higher than the predetermined strength from among the waveform detected from the signal component of the first frequency by the detection circuit, when the frequency switch selects the signal generated by the second frequency generator.

(i) The radar system may further include: (i1) a first frequency generator which generates a signal having a first frequency; (i2) a second frequency generator which generates a signal having a second frequency that is different from the first frequency; (i3) a frequency switch which selects one of the signal generated by the first frequency generator and the signal generated by the second frequency generator; and (i4) a first filter which passes a signal component of the first frequency, from the signal provided from the receiving circuit; (i5) a second filter which passes a signal component of a second frequency that is different from the first frequency, from the signal provided from the receiving circuit, (i6) wherein the receiving circuit outputs a signal into the first filter and the second filter, the signal being obtained by modulating one of the reflected wave and the radar wave delayed by the delay line, and the modulating being performed by using the signal selected by the frequency switch, (i7) the detection circuit detects a waveform having a strength equal to or higher than the predetermined strength, individually from (i) the signal component of the first frequency which is outputted from the receiving circuit via the first filter and (ii) the signal component of the second frequency which is outputted from the receiving circuit via the second filter, and (i8) the judgment circuit (i) determines that abnormality occurs in the radar system, if there is the waveform having the strength equal to or higher than the predetermined strength from among the waveform detected from the signal component of the second frequency by the detection circuit, when the frequency switch selects the first frequency generator, and (ii) determines that abnormality occurs in the radar system, if there is the waveform having the strength equal to or higher than the predetermined strength from among the waveform detected from the signal component of the first frequency by the detection circuit, when the frequency switch selects the signal generated by the second frequency generator.

Based on the above, the radar system according to the second embodiment is described herein.

It should be noted that identical references in the first embodiment are assigned to identical units in the second embodiment. Therefore, the identical units are not explained again below. It should also be noted that, also in the second embodiment, the structure which processes the in-phase (I) components and the quadrature (Q) components is assumed to have a structure for only one channel in the below description.

Figure 8:
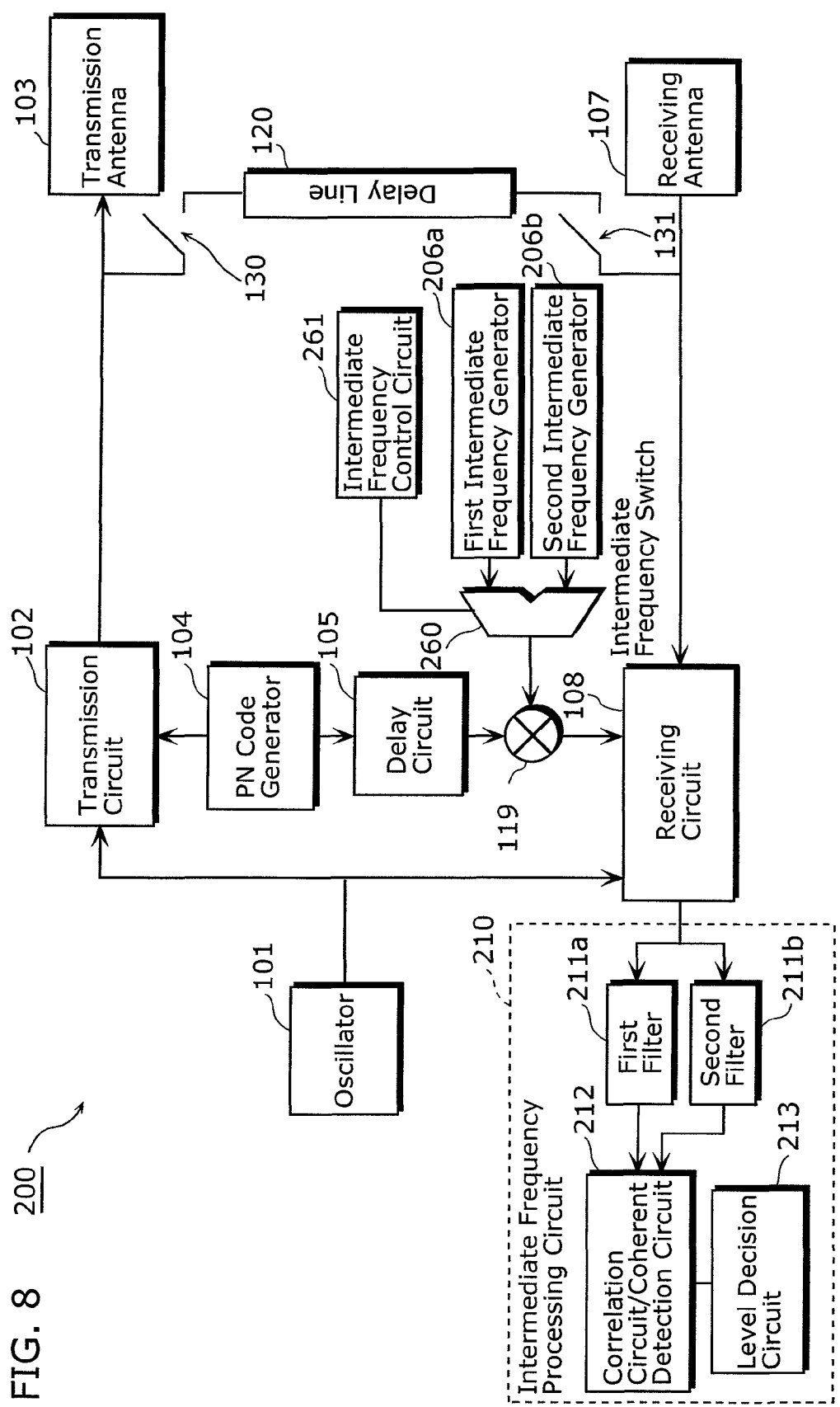
FIG. 8 is a block diagram showing a structure of a radar system according to the second embodiment of the present invention.

FIG. 8 is a block diagram showing a structure of the radar system according to the second embodiment of the present invention. The radar system 200 of FIG. 8 diagnoses abnormality occurred in the system, using a plurality of intermediate frequency generators having respective different frequencies and a plurality of filters having respective different frequency characteristics.

As shown in FIG. 8, a structure of the radar system 200 of the second embodiment is basically the same as the structure of the radar system 100 of FIG. 2. However, the radar system 200 of FIG. 8 differs from the radar system 100 of FIG. 2 in that the intermediate frequency processing circuit 110 is replaced by an intermediate frequency processing circuit 210, that a first intermediate frequency generator 206a, a second intermediate frequency generator 206b, an intermediate frequency switch 260, and an intermediate frequency control circuit 261 are added, and that the correlation circuit/coherent detection circuit 112 and the level decision circuit 112 are replaced by a correlation circuit/coherent detection circuit 212 and a level decision circuit 213.

The intermediate frequency processing circuit 210 has a first filter 211a and a second filter 211b, instead of the filter 111.

The first filter 211a has the first frequency characteristics, and passes the first signal components of the signal provided from the receiving circuit 108.

The second filter 211b has the second frequency characteristics which are different from the first frequency characteristics, and passes the second signal components which are different from the first signal components, from the signal provided from the receiving circuit 108.

The correlation circuit/coherent detection circuit 212 detects a waveform having a strength equal to or higher than a predetermined strength, from each of the first signal components and the second signal components independently, and then determines a delay amount of the detected waveform using a delay amount by which a PN code has been delayed by the delay circuit 105.

During the normal operation of the system, the level decision circuit 213 checks existence of any objects from the waveform detected by the correlation circuit/coherent detection circuit 212. During the self-diagnosis, the level decision circuit 213 checks whether or not the waveform detected by the correlation circuit/coherent detection circuit 212 is a delayed waveform which is generated according to the delay amount of the delay line 120. If the detected waveform is not the delayed waveform but has erroneously occurred due to other aspects except the delay amount of the delay line 120, the level decision circuit 213 determines that the system has abnormality.

The first intermediate frequency generator 206a generates an intermediate frequency signal having the first intermediate frequency f1, and provides the generated intermediate frequency signal to the intermediate frequency switch 260. Here, as the intermediate frequency signal the intermediate frequency generator 206a generates signal whose frequency ranges from several kHz to several hundreds of kHz, for example.

The second intermediate frequency generator 206b generates an intermediate frequency signal having the second intermediate frequency f2 which is different from the first intermediate frequency f1, and provides the generated intermediate frequency signal to the intermediate frequency switch 260. Here, as the intermediate frequency signal the intermediate frequency generator 206b generates signal whose frequency ranges from several kHz to several hundreds of kHz, for example.

According to a control signal provided from the intermediate frequency control circuit 261 or a trigger signal provided from the outside (not shown), the intermediate frequency switch 260 selects, as an input source, the first intermediate frequency generator 206a or the second intermediate frequency generator 206b, and then provides the mixer 109 with an intermediate frequency signal outputted from the selected input source.

It should be noted that a signal for determining a timing of the switching the input source of the intermediate frequency switch 260 may be a pulse signal for determining a timing of scanning within a detection distance range of radar.

It is assumed in this description that the radar system has a plurality of first intermediate frequency generators and filters, such as the first intermediate frequency generator 206a, the second intermediate frequency generator 206b, the first filter 211a, and the second filter 211b, at the same time. Here, it is also possible to determine whether or not abnormality occurs in the system, if at least one of the intermediate frequency generator function or the filter function has plural generators or filters. Furthermore, even if there are a plurality of the intermediate frequency generators and/or the filters, the generators and/or the filters are similar circuits, so that they can be easily embedded in the system. The above is described with reference to FIGS. 9 to 12.

(First Diagnosis Method)

As shown in FIG. 9, (i) a signal modulated by the first intermediate frequency f1 and (ii) a signal having an abnormal signal are provided from the receiving circuit 108 (refer to graph 271). In this graph, a spectrum of the modulated signal and a spectrum of the abnormal signal are overlapped with each other, and they are within the frequency characteristics of the first filter 211a.

In this case, the first filter 211a outputs the first signal components which have the modulated signal and the abnormal signal from among signals provided from the receiving circuit 108. Therefore, from the first signal components outputted from the first filter 211a, the correlation circuit/coherent detection circuit 212 detects a waveform having a strength equal to or higher than a predetermined strength. However, there is a case where a determination as to whether the detected waveform is a normal waveform or an abnormal waveform fails. For example, it is sometimes not possible to distinguish an abnormal waveform from a normal waveform, in the case where the signal has distortion or reflection.

Moreover, the radar system using the spread spectrum scheme sometimes has a spurious waveform in its detected signals. The reason is explained below. Due to influence of reflection or non-linear elements, a code (hereinafter, referred to as a "code M1'") which is delayed with several chips from an originally used PN code (hereinafter, referred to as a "code M1") exist at the same time with the code M1, and these codes M1 and M1' are overlapped with each other (exclusive OR), thereby causing a new code (hereinafter, referred to as a "code M2"). Here, the code M2 is equivalent to a code which is obtained by shifting the original code M1, known as shift-and-add property of PN code. Thereby, a waveform (spurious waveform) which does not exist originally exits at a position related to a delay amount corresponding to the shifting of the originally used PN code.

In the above case, the determination as to whether the detected waveform is a normal waveform or an abnormal waveform fails sometimes. However, the radar system 100 according to the first embodiment of the present invention can detect such a spurious waveform in some cases. However, the radar system 100 according to the first embodiment sometimes fails to detect a waveform (erroneous detection waveform) which has been generated due to non-linear elements other than the above non-linear element.

For example, it is assumed that a center frequency of an error signal unique to the radar system is overlapped with the first intermediate frequency f1. It is also assumed that a signal modulated by the first intermediate frequency f1 and a signal having the error signal are provided from the receiving circuit 108.

Under the assumption, the first filter 211a outputs the first signal components which have the modulated signal and the abnormal signal from among signals provided from the receiving circuit 108. Thereby, from the first signal components outputted from the first filter 211a, the correlation circuit/coherent detection circuit 212 detects a waveform having a strength equal to or higher than a predetermined strength. Here, it is not possible to determine whether the detected waveform is (1) a waveform of the signal modulated by the first intermediate frequency f1 or (2) a waveform which occurs due to an error signal. Therefore, it is not possible to distinguish an abnormal waveform from a normal waveform.

Figure 10:
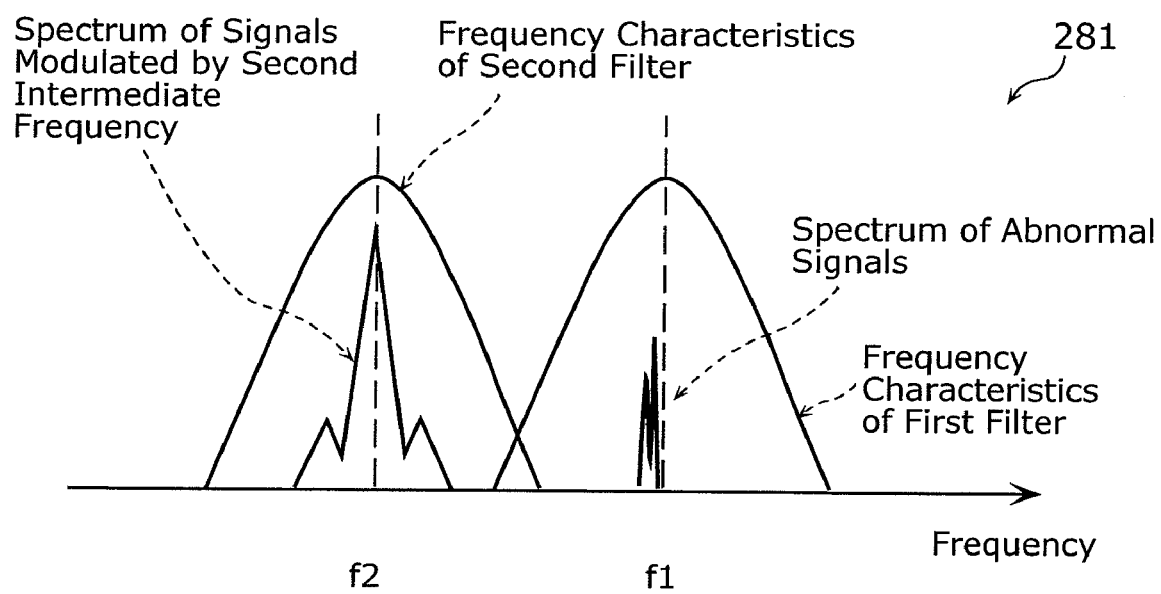
FIG. 10 is a graph for further explaining the outline of the first diagnosis method performed by the radar system according to the second embodiment of the present invention.

In order to solve the above problem, the intermediate frequency switch 260 switches the input source from the first intermediate frequency generator 206a to the second intermediate frequency generator 206b, so that the first filter 211a and the second filter 211b output respective different signal components, as shown in FIG. 10. It is assumed that the first filter 211a is a band-pass filter of the center frequency f1, and the second filter 211b is a band-pass filter of the center frequency f2. It is also assumed that frequency characteristics of these filters are slightly overlapped with each other, or not overlapped with each other. It should also be noted that a signal modulated by the second intermediate frequency f2 and a signal having an abnormal signal are provided from the receiving circuit 108 (refer to graph 281).

Under the assumption, from among signals provided from the receiving circuit 108, the first filter 211a outputs the first signal components having the error signal, and the second filter 211b outputs the second signal components including the modulated signal.

Here, if the first filter 211a outputs signal components having a strength equal to or higher than a predetermined strength, then it is determined that abnormality occurs in the system. On the other hand, if the first filter 211a does not output such signal components having a strength equal to or higher than the predetermined strength, then it is determined that no abnormality occurs in the system. Thereby, the level decision circuit 213 can determine that abnormality occurs in the system if there is a waveform having a strength equal to or higher than a predetermined strength from among waveforms detected from the first signal component by the correlation circuit/coherent detection circuit 212. On the other hand, the level decision circuit 213 can determine that no abnormality occurs in the system if there is no such a waveform having a strength equal to or higher than the predetermined strength from among them.

In addition, a waveform which is detected from the second signal components by the correlation circuit/coherent detection circuit 212 is only a waveform which is generated from the signal modulated by the second intermediate frequency f2. From the above observation, it is not possible to determine whether or the waveform detected from the second signal components is (1) a waveform of the signal modulated by the second intermediate frequency f2 or (2) a waveform which occurs due to an error signal. Furthermore, since only the waveform of the signal modulated by the second intermediate frequency f2 is detected, it is possible to determine whether the detected waveform is a normal waveform or an abnormal waveform, like the radar system 100 according to the first embodiment. Thereby, the level decision circuit 213 can determine whether the waveform detected from the second signal components by the correlation circuit/coherent detection circuit 212 is a normal waveform or an abnormal waveform.

Accordingly, the radar system 200 of the second embodiment can determine whether or not abnormality occurs in the system, by having the first intermediate frequency generator 206a, the second intermediate frequency generator 206b, the first filter 211a, and the second filter 211b. It should be noted that the abnormality detection can be realized even if the first filter 211a is not used or eliminated during the self-diagnosis in the case where it is not necessary to extract signal components including an error signal.

It should also be noted that, in this description, an abnormal signal such as the error signal is assumed to occur in the receiving circuit, for example. However, the second embodiment has the same effects and advantages as described above even if such an abnormal signal occurs in other circuit, so that the second embodiment can use the technique for various radar systems (Second Diagnosis Method)

In addition, in the case where the center frequency of the error signal is not overlapped with the first intermediate frequency, the following method is used to distinguish a normal waveform from an abnormal waveform.

Figure 11:
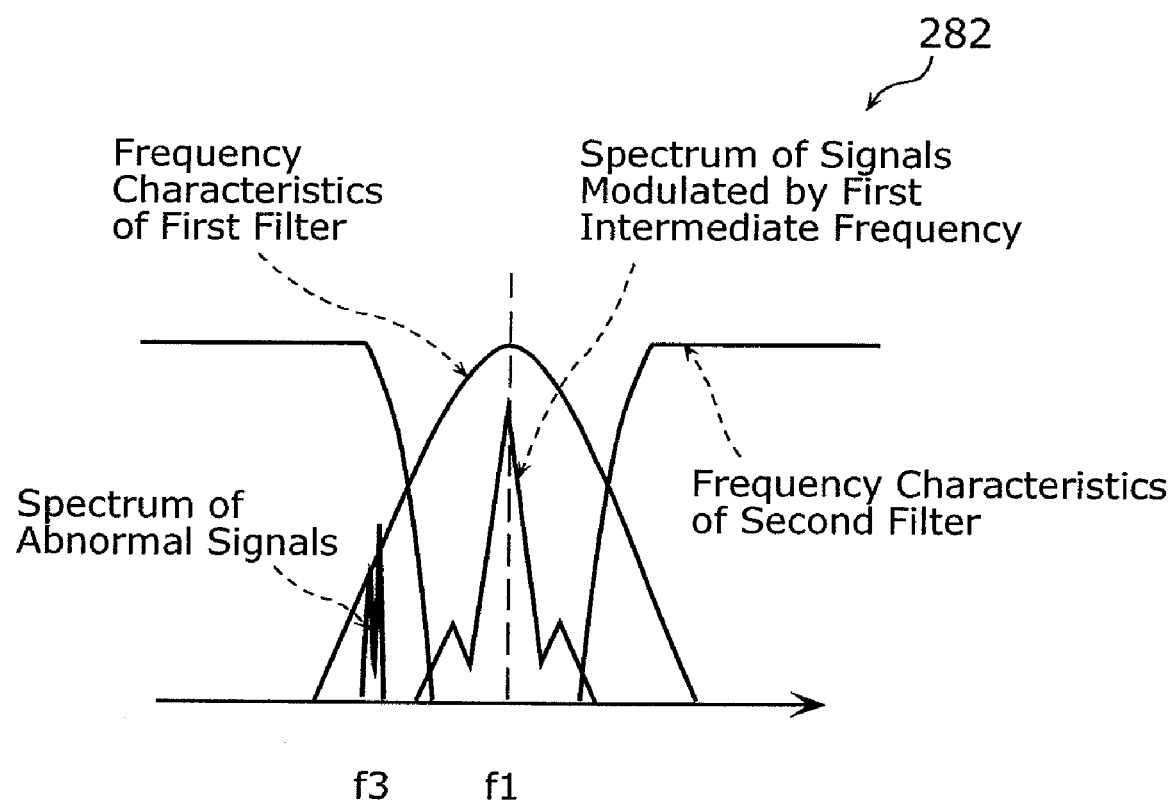
FIG. 11 is a graph for explaining an outline of the second diagnosis method performed by the radar system according to the second embodiment of the present invention.

For example, as shown in FIG. 11, it is assumed that (i) a signal modulated by the first intermediate frequency f1 and (ii) a signal having an abnormal signal whose center frequency is an intermediate frequency f3 are provided from the receiving circuit 108. Here, the first filter 211a is a band-pass filter of the center frequency f1, and the second filter 211b is a band-rejection filter which attenuates the first intermediate frequency f1 (refer to graph 282).

Under the assumption, from among signals provided from the receiving circuit 108, the first filter 211a outputs the first signal components having the signal modulated by the center frequency f1 and the abnormal signal whose center frequency is the intermediate frequency f3, and the second filter 211b outputs the second signal components which are signal components other than the signal components having the signal modulated by the first intermediate frequency f1.

Here, if the second filter 211b outputs signal components having a strength equal to or higher than a predetermined strength, then it is determined that abnormality occurs in the system. On the other hand, if the second filter 211b does not output such signal components having a strength equal to or higher than the predetermined strength, then it is determined that no abnormality occurs in the system. Thereby, the level decision circuit 213 can determine that abnormality occurs in the system if there is a waveform having a strength equal to or higher than a predetermined strength from among waveforms detected from the second signal component by the correlation circuit/coherent detection circuit 212. On the other hand, the level decision circuit 213 can determine that no abnormality occurs in the system if there is no such a waveform having a strength equal to or higher than the predetermined strength from among them.

In addition, from the second signal components outputted from the second filter 211b, the level decision circuit 213 can determine a delay amount detected by an abnormal signal whose center frequency is the intermediate frequency f3. If, from among waveforms detected from the first signal components outputted from the first filter 211a, there is, at a position of a specified delay amount, a waveform having a strength equal to or higher than a predetermined strength, the waveform is considered as a waveform which occurs due to the abnormal signal whose center frequency is the intermediate frequency f3. On the other hand, if, from among the detected waveforms, there is, at positions except the position of the specified delay amount, a waveform having a strength equal to or higher than the predetermined strength, the waveform is considered as a waveform which is different from the waveform that occurs due to the abnormal signal whose center frequency is the intermediate frequency f3. In short, the waveform is the waveform which occurs due to the signal modulated by the first intermediate frequency f1.

Thereby, the correlation circuit/coherent detection circuit 212 determines the first delay amount from the first signal components outputted from the first filter 211a. Further, the correlation circuit/coherent detection circuit 212 determines the second delay amount from the second signal components outputted from the second filter 211b. The level decision circuit 213 compares the first delay amount determined by the correlation circuit/coherent detection circuit 212 with the second delay amount. If the first delay amount is the same as the second delay amount, the level decision circuit 213 determines that the waveform at a position of is the first delay amount is a waveform which occurs due to an abnormal signal whose center frequency is the intermediate frequency f3. On the other hand, if the first delay amount is different from the second delay amount, the level decision circuit 213 determines that the waveform at the position of the first delay amount is a waveform which occurs due to the signal modulated by the first intermediate frequency f1.

Accordingly, the radar system 200 can determine whether or not abnormality occurs in the system, by having the first intermediate frequency generator 206a, the first filter 211a, and the second filter 211b. It should be noted that, without the second intermediate frequency generator 206b, it is possible to detect abnormality occurred in the system, in the case where it is not necessary to use the second intermediate frequency f2.

(Third Diagnosis Method)

Figure 12:
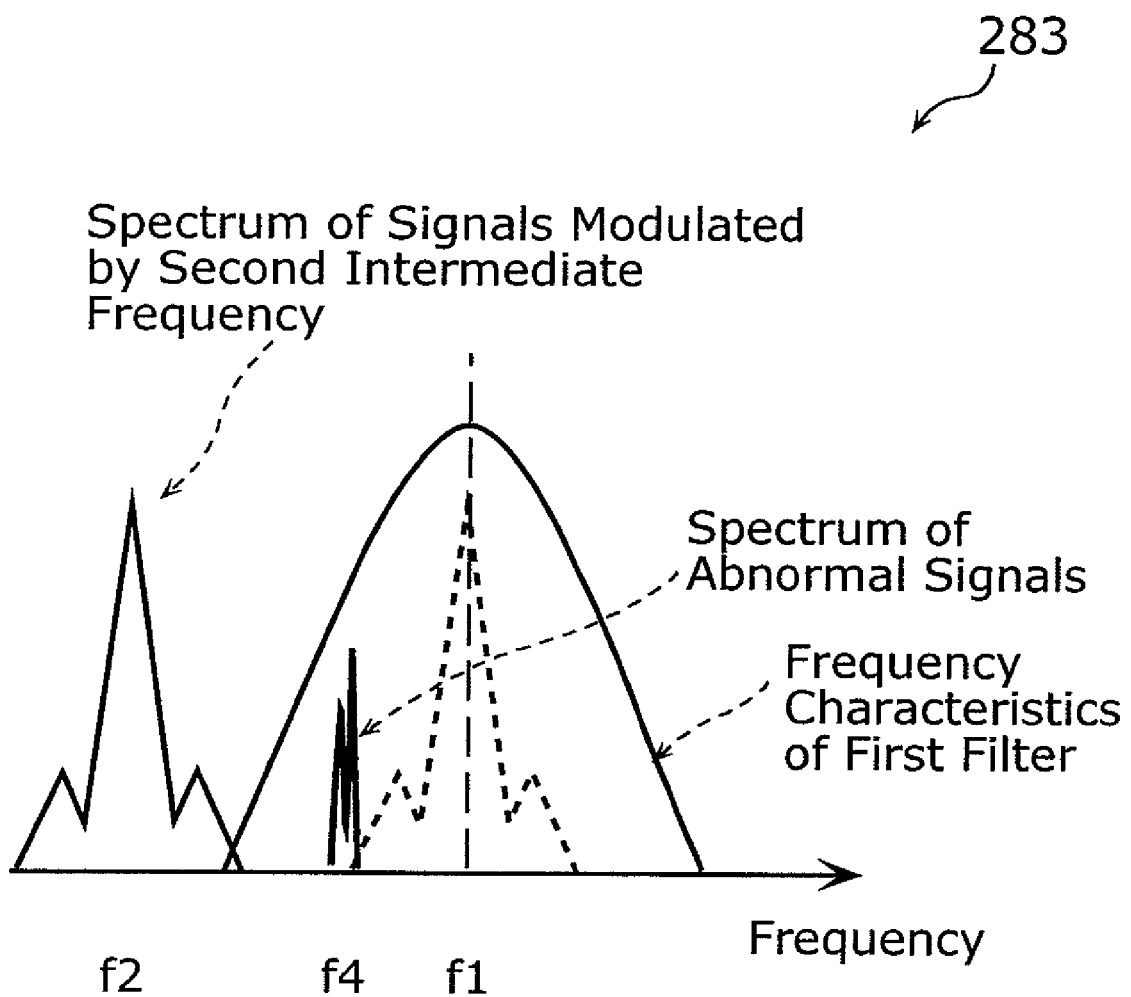
FIG. 12 is a graph for explaining an outline of the third diagnosis method performed by the radar system according to the second embodiment of the present invention.

For the third diagnosis method, as shown in FIG. 12, it is assumed that (i) a signal modulated by the second intermediate frequency f2 and (ii) a signal having an abnormal signal whose center frequency is an intermediate frequency f4 are provided from the receiving circuit 108. Here, the first filter 211a is assumed to be a band-pass filter of the center frequency f1. It is also assumed that a spectrum of the abnormal signal whose center frequency is the intermediate frequency f4 is within the frequency characteristic of the first filter 211a. It is also assumed that the spectrum of the signal modulated by the second intermediate frequency f2 is not within the frequency characteristic of the first filter 211a. In other words, it is assumed that signal components of the second intermediate frequency f2 are sufficiently attenuated by the first filter 211a (refer to a graph 283).

Under the assumption, the first filter 211a outputs the first signal components which have the abnormal signal whose center frequency is the intermediate frequency f4 from among signals provided from the receiving circuit 108. Here, the first filter 211a does not output signal components which have the signal modulated by the second intermediate frequency f2.

Here, if the first filter 211a outputs signal components having a strength equal to or higher than a predetermined strength, it is possible to determine that abnormality occurs in the system. On the other hand, if the first filter 211a does not output such signal components having a strength equal to or higher than the predetermined strength, then it is determined that no abnormality occurs in the system. Thereby, the intermediate frequency switch 260 switches the first intermediate frequency generator 206a and the second intermediate frequency generator 206b alternately as the input source. Even if the second intermediate frequency generator 206b is selected as the input source, the level decision circuit 213 can determine that abnormality occurs in the system if there is a waveform having a strength equal to or higher than a predetermined strength from among waveforms detected from the first signal components by the correlation circuit/coherent detection circuit 212. On the other hand, even if the second intermediate frequency generator 206b is selected as the input source, the level decision circuit 213 can determine that no abnormality occurs in the system if there is no such a waveform having a strength equal to or higher than the predetermined strength from among them.

Accordingly, the radar system 200 of the second embodiment can separate the abnormal signal whose center frequency is the intermediate frequency f4, from the signal modulated by the second intermediate frequency f2, by having the first intermediate frequency generator 206a, the second intermediate frequency generator 206b, and the first filter 211a. From the separated signal components, which are signal components including the abnormal signal whose center frequency is the intermediate frequency f4, it is possible to determine whether or not abnormality occurs in the system. It should be noted that, without the second filter 211b, it is possible to detect, during the self-diagnosis, abnormality occurred in the system, in the case where it is not necessary to extract signal components including the signal modulated by the second intermediate frequency f2.

Therefore, it is possible to detect abnormality occurs in the system using various diagnosis methods, if at least one of the intermediate frequency generator function or the filter function has plural generators or filters, and the plural generators or filters have different characteristics.

It should be noted that the plural intermediate frequency generators may be replaced by a single intermediate frequency generator which can vary frequency in the frequency generating. Such a variable intermediate frequency generator can be implemented as a digital synthesizer or the like in a digital integrated circuit. It should also be noted that the plural filters may be replaced by a single filter which can vary the frequency characteristics. Such a variable filter can be implemented as a digital filter in a digital integrated circuit. It should also be noted that the plural intermediate frequency generators and the plural filters may be replaced by the single variable intermediate frequency generator and the signal variable filter. Here, it is possible to vary the generating frequency, by control the variable intermediate frequency generator from the outside to vary the frequency, or by storing data indicating the generate-able frequencies into a memory and updating the data. Further, it is possible to vary the frequency characteristics, by control the variable filter from the outside to vary the frequency characteristics, or by storing filter data indicating the frequency characteristics into a memory and updating the filter data.

It should also be noted that it is also possible to use an intermediate frequency generator whose generate-able frequency is fixed and a filter whose frequency characteristics are fixed, in order to detect radar signals, and use a variable intermediate frequency generator whose generate-able frequency is varied and a variable filter whose frequency characteristics are varied, in order to detect abnormal signals.

For example, the first intermediate frequency generator 206a is used as an intermediate frequency generator whose generatable frequency is fixed. Further, the second intermediate frequency generator 206b is used as a variable intermediate frequency generator whose generate-able frequency is varied. The first filter 211a is used as a filter whose frequency characteristics are fixed. The second filter 211b is used as a variable filter whose frequency characteristics are varied.

In this case, the first intermediate frequency generator 206a and the first filter 211a are used to detect radar signals, and the second intermediate frequency generator 206b and the second filter 211b are used to detect abnormal signals.

Thereby, it is possible to reduce a problem that characteristics of the intermediate frequencies and the filters for the radar signal detection are affected by wrong control or the outsides.

Accordingly, the radar system 200 of the second embodiment has plural intermediate frequency generators and plural filters, and thereby can detect abnormality occurred in the system based on the above-described diagnosis methods.

For example, in the radar system 100 according to the first embodiment, there is a possibility that abnormal waveforms are outputted without being determined as abnormal. However, the radar system 200 according to the second embodiment can detect abnormal waveforms which have been erroneously generated in the system, due to various aspects based on the above-described diagnosis methods using the plural intermediate frequency generators and the plural filters, which can lower the possibility of the abnormal waveform outputting, thereby solving the above problem.

Moreover, it is necessary in radar systems to implement the delay line with limited length and pattern due to cost and size restriction. Even in such a situation, abnormality occurred in the systems should be detected from subtle information obtained from the delay line having a limited length. The radar system 200 according to the second embodiment can meet the above challenge, by having a relatively inexpensive and simple structure to implement a function of detecting abnormal waveforms due to various aspects. This is because signals generated by the intermediate frequency generator have frequencies ranging from several kHz to several hundreds of kHz, for example, which are lower than the frequency of carrier waves and therefore easily processed by the system. Therefore, the radar system 200 according to the second embodiment can implement the intermediate frequency generator in a digital system.

Furthermore, it is required in radar systems to detect abnormality of the systems in the condition where all elements used during the normal operation are activated. The radar system 200 according to the second embodiment can meet the requirement, since the plural intermediate frequency generators and the plural filters are used also during the normal operation, thereby detecting abnormality of the system in the condition where all elements used during the normal operation are activated.

Accordingly, the radar system according to the present invention can detect the abnormal waveforms occurred in the system, using only the same auxiliary circuits as the circuits required in the conventional radar systems. Therefore, the radar system according to the present invention can prevent size and cost increase.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of this invention.

INDUSTRIAL APPLICABILITY

The present invention can be used as a radar device or system with a self-diagnosis function or the like, and especially as an in-vehicle radar device or system or the like.

What is claimed is:

1. A radar system which transmits a radar wave, receives a reflected wave that is the radar wave which has been reflected or scattered by an object, and detects the object by the reflected wave, said radar system comprising:
a transmitter which transmits the radar wave via a transmission antenna;
a receiver which receives the reflected wave via a receiving antenna;
a delay line which has an end connected to an output port of said transmitter and an other end connected to an input port of said receiver, and which delays the radar wave by a predetermined delay amount;
a detector which detects a waveform having a strength equal to or higher than a predetermined strength, from a signal provided from said receiver which obtains the signal from one of the reflected wave and the radar wave delayed by said delay line; and
a judger which judges, when self-diagnosis is performed, whether the waveform detected by said detector is a waveform of the radar wave delayed by said delay line according to the predetermined delay amount, and when the waveform is not the waveform of the radar wave delayed by said delay line, determines that an abnormality occurs in said radar system,
wherein said radar system employs a spread spectrum scheme using a pseudo noise code, and
wherein a line length of said delay line is shorter than a line length of a maximum delay line by which the radar wave is delayed by a delay amount equivalent to one cycle of a code length of the pseudo noise code.

2. The radar system according to claim 1,
wherein said delay line is connected to the output port of said transmitter or the input port of said receiver via a switch, and
wherein said radar system inputs, when the self-diagnosis is performed, the radar wave transmitted by said transmitter into said delay line using said switch.

3. The radar system according to claim 2, further comprising:
- a plurality of delay lines including said delay line; and
- a plurality of switches including said switch included in each of said plurality of delay lines,
- wherein a predetermined delay line by which the radar wave is to be delayed is selected from among the plurality of delay lines, depending on an ON/OFF state for each of the plurality of switches.

4. The radar system according to claim 1,
wherein said transmission antenna is electrically interfaced to the output port of said transmitter.

5. The radar system according to claim 1, further comprising:
- a storage in which the predetermined delay amount is stored; and
- a corrector which calibrates said radar system according to a delay amount of the waveform detected by said detector and the predetermined delay amount stored in said storage.

6. A radar system which transmits a radar wave, receives a reflected wave that is the radar wave which has been reflected or scattered by an object, and detects the object by the reflected wave, said radar system comprising:
- a transmitter which transmits the radar wave via a transmission antenna;
- a receiver which receives the reflected wave via a receiving antenna;
- a delay line which has an end connected to an output port of said transmitter and an other end connected to an input port of said receiver, and which delays the radar wave by a predetermined delay amount;
- a detector which detects a waveform having a strength equal to or higher than a predetermined strength, from a signal provided from said receiver which obtains the signal from one of the reflected wave and the radar wave delayed by said delay line; and
- a judger which judges, when self-diagnosis is performed, whether the waveform detected by said detector is a waveform of the radar wave delayed by said delay line according to the predetermined delay amount, and when the waveform is not the waveform of the radar wave delayed by said delay line, determines that an abnormality occurs in said radar system;
- a first frequency generator which generates a signal having a first frequency;
- a first filter which filters the signal provided by said receiver to pass a signal component of the first frequency; and
- a second filter which filters the signal provided by said receiver to pass a signal component of a second frequency that is different from the first frequency,
- wherein said receiver outputs the signal to said first filter and said second filter, the signal being obtained by modulating one of the reflected wave and the radar wave delayed by said delay line using the signal having the first frequency generated by said first frequency generator,
- wherein said detector detects a waveform having a strength equal to or higher than the predetermined strength, individually from the signal component of the first frequency which is outputted from said receiver via said first filter and the signal component of the second frequency which is outputted from said receiver via said second filter, and
- wherein said judger determines that the abnormality occurs in said radar system, when there exists the waveform having the strength equal to or higher than the predetermined strength from the waveform detected from the signal component of the second frequency by said detector.

7. A radar system which transmits a radar wave, receives a reflected wave that is the radar wave which has been reflected or scattered by an object, and detects the object by the reflected wave, said radar system comprising:
- a transmitter which transmits the radar wave via a transmission antenna;
- a receiver which receives the reflected wave via a receiving antenna;
- a delay line which has an end connected to an output port of said transmitter and an other end connected to an input port of said receiver, and which delays the radar wave by a predetermined delay amount;
- a detector which detects a waveform having a strength equal to or higher than a predetermined strength, from a signal provided from said receiver which obtains the signal from one of the reflected wave and the radar wave delayed by said delay line; and
- a judger which judges, when self-diagnosis is performed, whether the waveform detected by said detector is a waveform of the radar wave delayed by said delay line according to the predetermined delay amount, and when the waveform is not the waveform of the radar wave delayed by said delay line, determines that an abnormality occurs in said radar system;
- a first frequency generator which generates a signal having a first frequency;
- a second frequency generator which generates a signal having a second frequency that is different from the first frequency;
- a frequency switch which selects one of the signal having the first frequency generated by said first frequency generator and the signal having the second frequency generated by said second frequency generator; and
- a first filter that filters the signal provided by said receiver to pass a signal component of the first frequency,
- wherein said receiver outputs the signal to said first filter, the signal being obtained by modulating one of the reflected wave and the radar wave delayed by said delay line using the signal selected by said frequency switch,
- wherein said detector detects a waveform having a strength equal to or higher than the predetermined strength, individually from the signal component of the first frequency which is outputted from said receiver via said first filter, and
- wherein said judger determines that the abnormality occurs in said radar system, when there exists the waveform having the strength equal to or higher than the predetermined strength from the waveform detected from the signal component of the first frequency by said detector, when said frequency switch selects the signal having the second frequency component generated by said second frequency generator.

8. A radar system which transmits a radar wave, receives a reflected wave that is the radar wave which has been reflected or scattered by an object, and detects the object by the reflected wave, said radar system comprising:
- a transmitter which transmits the radar wave via a transmission antenna;
- a receiver which receives the reflected wave via a receiving antenna;
- a delay line which has an end connected to an output port of said transmitter and an other end connected to an input port of said receiver, and which delays the radar wave by a predetermined delay amount;

a detector which detects a waveform having a strength equal to or higher than a predetermined strength, from a signal provided from said receiver which obtains the signal from one of the reflected wave and the radar wave delayed by said delay line; and a judger which judges, when self-diagnosis is performed, whether the waveform detected by said detector is a waveform of the radar wave delayed by said delay line according to the predetermined delay amount, and when the waveform is not the waveform of the radar wave delayed by said delay line, determines that an abnormality occurs in said radar system;

a first frequency generator which generates a signal having a first frequency;

a second frequency generator which generates a signal having a second frequency that is different from the first frequency;

a frequency switch which selects one of the signal having the first frequency generated by said first frequency generator and the signal having the second frequency generated by said second frequency generator; and a first filter that filters the signal provided by said receiver to pass a signal component of the first frequency, a second filter that filters the signal provided by said receiver to pass a signal component of the second frequency that is different from the first frequency, wherein said receiver outputs a signal to said first filter and said second filter, the signal being obtained by modulating one of the reflected wave and the radar wave delayed by said delay line by using the signal selected by said frequency switch, wherein said detector detects a waveform having a strength equal to or higher than the predetermined strength, individually from the signal component of the first frequency which is outputted from said receiver via said first filter and the signal component of the second frequency which is outputted from said receiver via said second filter, and wherein said judger determines that the abnormality occurs in said radar system, when there exists the waveform having the strength equal to or higher than the predetermined strength from the waveform detected from the signal component of the second frequency by said detector, when said frequency switch selects the signal having the first frequence generated by said first frequency generator, and determines that the abnormality occurs in said radar system, when there exists the waveform having the strength equal to or higher than the predetermined strength, from the waveform detected from the signal component of the first frequency by said detector, when said frequency switch selects the signal having the second frequency generated by said second frequency generator.

* * * * *